United States Patent [19]

Bartholomew

[11] Patent Number: 4,660,589

[45] Date of Patent: Apr. 28, 1987

[54] OPTICAL FEEDBACK LOOP SYSTEM FOR A HYDRAULIC SERVOVALVE

[75] Inventor: Richard D. Bartholomew, Huntsville, Ala.

[73] Assignee: The Boeing Company, Seattle, Wash.

[21] Appl. No.: 835,163

[22] Filed: Mar. 3, 1986

[51] Int. Cl.[4] .............................................. G05D 16/00

[52] U.S. Cl. ........................................ 137/83; 251/11; 60/530

[58] Field of Search .............. 137/83; 251/11; 60/530, 60/531, 527; 350/96.10, 96.29, 1.1

[56] References Cited

U.S. PATENT DOCUMENTS

| | | | |
|---|---|---|---|
| 3,386,343 | 6/1968 | Gray | 137/83 X |
| 3,603,338 | 9/1971 | Kast | 137/83 |
| 3,710,814 | 1/1973 | Shinn | 137/83 |
| 3,721,421 | 3/1973 | Cliff | 251/11 |
| 4,114,645 | 9/1978 | Pauliukonis | 137/596.7 |

*Primary Examiner*—Alan Cohan

[57] ABSTRACT

An optical feedback loop system used in conjunction with an optical hydraulic servovalve. The system uses light energy from a single fiber optic bundle for expanding a gas in a pair of bellows. When one of the bellows is expanded a jet pipe connected to a servo fluid inlet is moved from a first fluid outlet to a second fluid outlet.

5 Claims, 4 Drawing Figures

OPTICAL FEEDBACK LOOP SYSTEM FOR A HYDRAULIC SERVOVALVE

BACKGROUND OF THE INVENTION

This invention relates to a hydraulic servovalve assembly optically operated and more particularly to a feedback loop system used with a fiber optic transmission line for operating a jet pipe connected to a hydraulic servovalve.

In a patent application entitled AIRCRAFT FIBER OPTIC CONTROL DEVICE, filed Mar. 16, 1984, Ser. No. 590,151 by the subject inventor, an electrically passive open hydraulic servovalve system is described. The system is used to minimize the effect of electromagnetic pulses and electromagnetic interferences on aircraft control systems. This type of basic optical hydraulic servovalve system can be greatly improved by incorporating an electrically passive optical feedback loop internal to the servovalve assembly. Operating parameters such as servovalve gains and phase shift are greatly improved when feedback concepts can be integrated into the servovalve system.

In a basic optical hydraulic servovalve operation, a series of energy conversions consisting of converting light energy into heat energy then into mechanical function and finally into change in hydraulic flow rate is provided. Functionally, this process is an integration operation with the inherent undesired phase shift that is characterized by integration processes. If the optical hydraulic servovalve input signal is the "error signal" derived by comparing the optical hydraulic servovalve hydraulic output with the optical input instead of an open loop input signal, this feedback loop will minimize the inherent phase shift due to the integration process and enhance the servovalve gain.

During the test and operation of the optical hydraulic servovalve a large loop feedback approach was used to demonstrate the valve of a feedback system in reducing the servovalve phase shift and thereby enhancing servovalve gain. This feedback loop was complicated and encompassed numerous disciplines such as hydraulic pressure sensing, optical signal transmissions and electronic processing. The performance of large feedback schemes are limited since the error signal contains nonlinearities of many subsystems which often produce instability and runaway servosystems.

In the following United States patents; U.S. Pat. No. 27,352 to Stern, U.S. Pat. No. 2,726,617 to Zand, U.S. Pat. No. 2,996,072 to Atchley, U.S. Pat. No. 3,401,603 to Coakley et al, U.S. Pat. No. 3,424,183 to Coakley, U.S. Pat. No. 3,433,133 to Brewer et al and U.S. Pat. No.3,908,471 to O'Connor et al various types of servovalve control systems using jet pipe assemblies and expandable bellows are described. None of these prior art patents describe the unique features and advantages of the subject invention.

SUMMARY OF THE INVENTION

The subject invention provides a solution to the above-mentioned problems such as the effect of electromatic pulses and interferences inherent with an optical hydraulic servovalve used in aircraft control systems.

The feedback loop system is optical-mechanical in nature and is fully contained within an optical hydraulic servovalve assembly.

The feedback loop system requires only a single fiber optic bundle replacing two separate fiber optic transmission lines used in the past for driving two bellows assemblies. The system uses optical energy for heating small quantities of gas in the bellows which in turn move a jet pipe used in a conventional jet pipe hydraulic servovalve.

The subject feedback loop assembly includes an energy fiber optic bundle connected at one end and driven by a beam deflector which is part of an electro-optic source. The other end of the bundle is disposed in front of a beam directing mirror. The mirror is mounted on top of a jet pipe with the mirror reflecting an optical beam from the optic bundle into either a first or second gas filled bellow. The bellows moving a jet pipe connected to the servovalve. On alignment of the servovalve the optical beam is split by the mirror to the bellows which maintains the alignment of the jet pipe holding the system in a null position.

The advantages and objects of the invention will become evident from the following detailed description of the drawings when read in conjunction with the accompanying drawings which illustrate preferred embodiments of the invention.

DETAILED DESCRIPTION OF THE DRAWINGS

Figure 1:
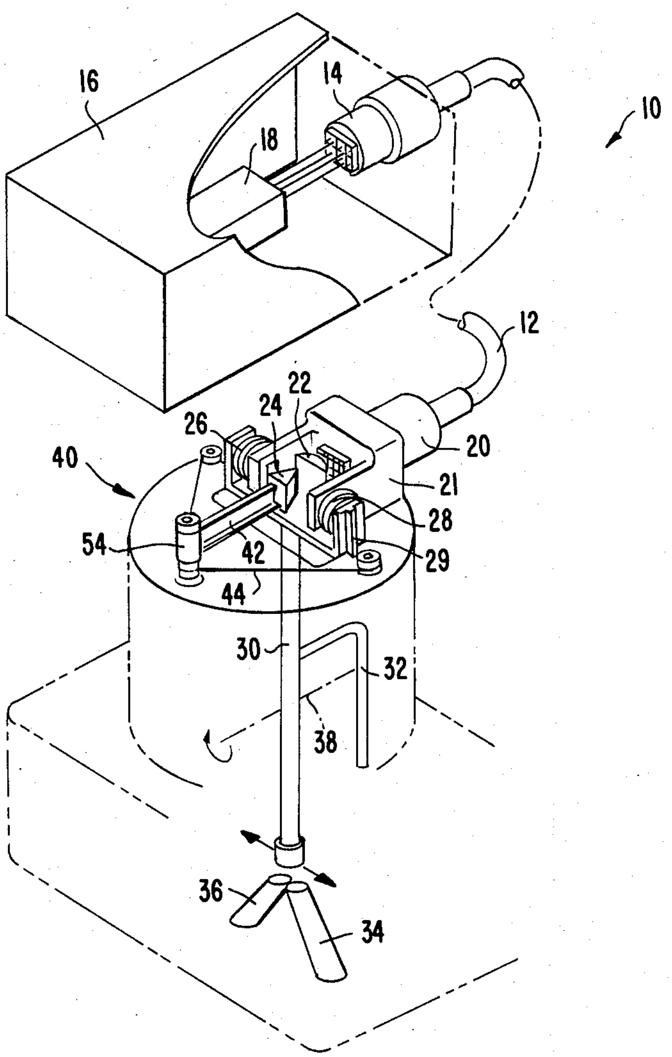
FIG. 1 illustrates a perspective view of an optical hydraulic feedback loop assembly connected to the electro-optic source.

In FIG. 1 the optical feedback loop system is designated as general reference numeral 10 and includes an imaging fiber optic bundle 12 having a first end portion 14 for receiving optical energy from an electro-optic source 16 having a beam deflector 18. A second end portion 20 of the bundle 12 is connected to a bundle support housing 21 having a beam shaper 22 disposed in front of the end portion 20 for directing optical energy onto a 90 degree surface beam directing mirror 24. The mirror 24 directs incoming optical signals into either or both of gas filled bellows 26 and 28. The bellows are connected to a "U" shaped support 29 having a jet pipe 30 connected thereto. The jet pipe 30 is connected to part of a servovalve having a servo fluid inlet 32 and a first and second servo fluid outlets 34 and 36. The jet pipe 30 when moved by the bellows 26 and 28 rotates about a pivot point shown as line 38. The entire servovalve is not shown in the drawings.

In operation the optical feedback loop system 10 uses the optical energy received through the optic bundle 12 to heat small quantities of gas contained in the bellows 26 and 28. This creates pneumatic pressure which in turn moves the "U" shaped support 29 to the left or the right which pivots the downwardly extending jet pipe 30 in an arc about the pivot point 38. This motion moves the fluid inlet 32 so it will communicate either with the fluid outlet 34 or fluid outlet 36. It should be noted that the small displacements of the jet pipe from a neutral position produces useful changes in servovalve hydraulic output flow rate and pressures. The two opposing bellows 26 and 28 are used to move the jet pipe from either side of a neutral position. The dual bellows improves the frequency response of the servovalve and compensate for variations in ambient temperatures.

The position of the optical beam is a desired or commanded jet pipe position and if at any point in time the jet pipe 30 is not aligned with the optical beam, the mirror 24 mounted on top of the jet pipe 30 directs the total optical beam into either the bellow 26 or the bellow 28 and in turn moves the jet pipe 30 toward the optical position until it is aligned. On alignment, the optical beam received from the beam shaper 22 is split between the two bellows which maintains the alignment of the jet pipe 30 with the optical beams and the system 10 is nulled.

The jet pipe position is used as an output indicator because the displacement of the jet pipe from the null position is literally proportional to the servovalve output hydraulic flow rate at no load.

The beam from the electro-acoustic source 16 is commanded to a desired position across the rectangular imaging fiber optic bundle 12. The beam path is either split by beaming onto an apex 25 shown in FIG. 3 of the mirror 24 or the total beam is directed into one or the other bellow. If either bellow is subjected to the total beam, the contained gas will expand and drive the jet pipe 30 toward the center of the beam path and then into the null position.

In order to obtain high servo system resolution, a motion amplifying mechanism 40 is used to multiply for example 0.005 to 0.012 inch total excursion from the top of the jet pipe 30 to a 0.050 to 0.120 inch excursion of the directing mirror 24. The beam carrying imaging fiber bundle 12 second end portion 20 is sized to accommodate the mirror motion as it pivots about a mirror arm 42. The mechanism 40 includes a cable 44 connected to the bellows 26 and 28 and received around pulleys 48, 50 and a pulley 52 at the bottom of a pivot base 54 connected to the mirror arm 42. It should be kept in mind that the mechanism 40 is only one example of a means for providing minimal backlash.

Figure 3:
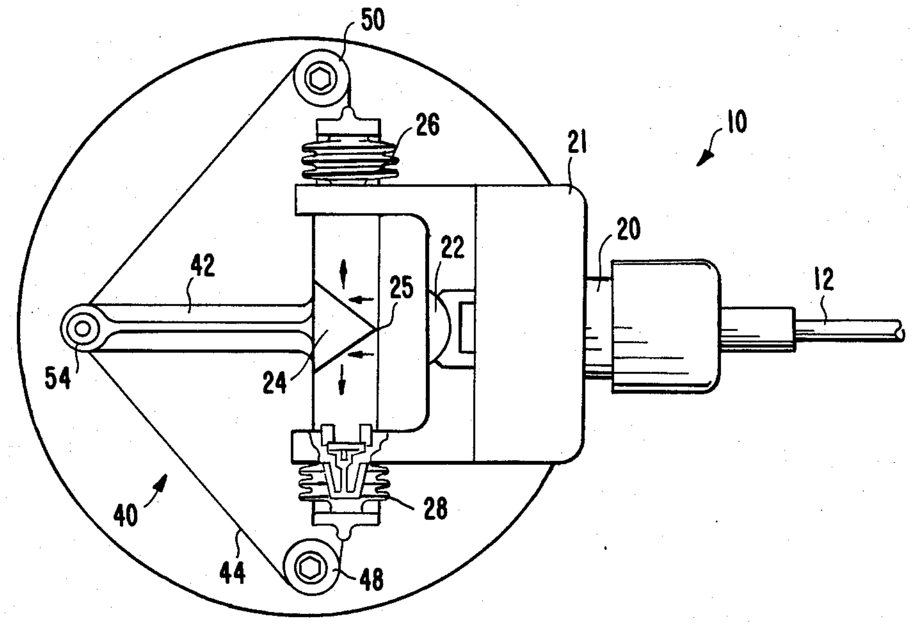
FIGS. 3 and 4 illustrate a top and side view of one end of the fiber optic bundle, beam shaper, bellows and beam directing mirror.
Figure 4:
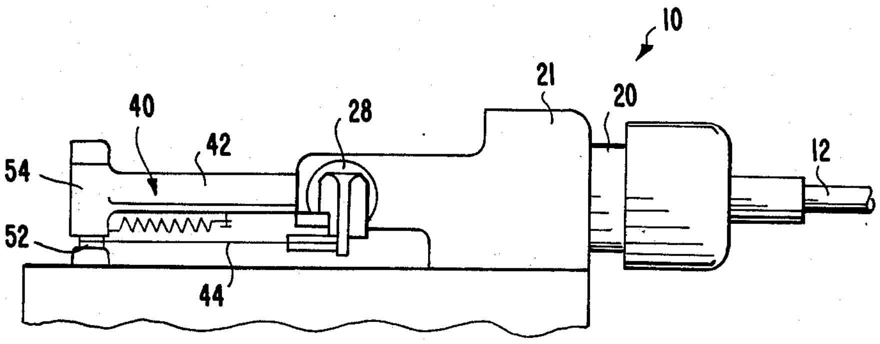

As shown in FIGS. 1, 3 and 4, the maximum beam deflection using the mirror 24 should be wide enough to scan any position on the face of the imaging fiber optic bundle 12 and the beam modulation frequency should be greater than the servovalve frequency response.

Figure 2:
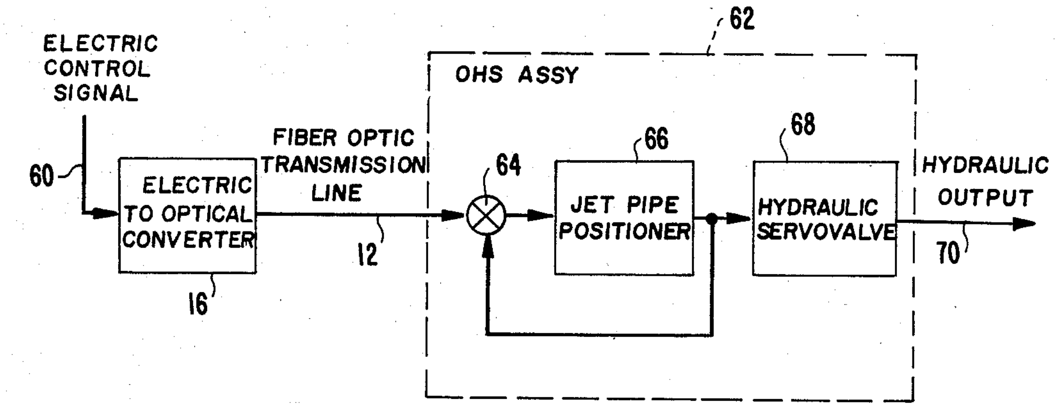
FIG. 2 illustrates a functional diagram of the feedback loop system.

In FIG. 2 the electro-optic source 16 connected to the fiber optic transmission line or bundle 12 receives an electric control signal 60. The electro-optic beam deflector device 18 shown in FIG. 1 is optional but one example could be a high powered laser diode in conjunction with a KDP crystal configured as an optical beam deflector. The deflection of a doubled prism KDP beam deflector is determined by the electric field applied to the crystals. Another example is a monothic laser diode array with a low powered laser diode beamed into one of the individual fibers of the imaging fiber optic bundle. An electronic processor will excite the selected laser diode required to produce the beam shape and position required.

An optical hydraulic servovalve assembly is shown in the functional diagram in FIG. 2 as dotted lines 62 with the feedback loop 10 being part of this assembly. In this diagram the fiber optic transmissions line 12 is shown connected to a functional symbol shown as a juncture 64 with a jet pipe positioner 66 as the feedback element. Also the pipe position is used as a comparison with the incoming optical beam position as the summing element of the feedback loop. Also shown in this diagram is the hydraulic servovalve 68 connected to the positioner 66 and the hydraulic output 70.

In FIGS. 3 and 4, a top and side view of the second end portion 20 of the fiber bundle 12 can be seen attached to the support housing 21 and received in front of the beam shaper 22. Also, seen in front of the beam shaper 22 is the beam directing mirror 24 with apex 25 for directing the light energy from the bundle 12 either to the first gas filled bellow 26 or the second gas filled bellow 28. The amplifying mechanism 40 is also seen with cable 44 received around the pulleys 48, 50 and 52 and the ends of the cable attached to the bellows 26 and 28. In FIG. 4 a spring 72 is shown attached to the mirror arm 42 for aid in tightening the tension of the cable 44.

Changes may be made in the construction and arrangement of the parts or elements of the embodiments as described herein without departing from the spirit or scope of the invention defined in the following claims.

I claim:

1. An optical feedback loop system for a hydraulic servovalve assembly, the loop system comprising:
- a fiber optic bundle having a first end portion adapted for connection to an electro-optic source for receiving an optical signal therefrom;
- a beam-directing mirror disposed in front of a second end portion of the optic bundle for receiving the optical signal therefrom;
- a pair of bellows disposed on opposite sides of the mirror for receiving the optical signal from the mirror;
- a jet pipe attached to the bellows, the jet pipe moved by an expanding gas in the bellows; and
- a servo fluid inlet and first and second servo fluid outlets connected to the jet pipe for directing the fluid from the inlet to the first or second fluid outlet.

2. The loop system as described in claim 1 wherein the jet pipe is attached to the bellows through the use of a "U" shaped support, the support having opposite ends attached to the bellows and the jet pipe attached to a bottom of the support and extending downwardly therefrom.

3. The loop system as described in claim 1 wherein the jet pipe when moved by the first or second bellow pivots about a pivot point perpendicular to the length of the pipe and moving the pipe in an arc for directing the jet pipe to the first or second fluid outlet.

4. The loop system as described in claim 1 further including a motion amplifying mechanism attached to the bellows and the beam-directing mirror for amplifying the motion and obtaining a high servo system resolution between the movement of the jet pipe and the beam-directing mirror.

5. An optical feedback loop system for a hydraulic servovalve assembly, the loop assembly comprising:
- a fiber optic bundle having a first end portion adapted for connection to an electro-optic source for receiving an optical signal therefrom;
- a beam-directing mirror received in front of a second end portion of the fiber optic bundle for receiving an optical signal therefrom;
- a pair of bellows disposed on opposite sides of the mirror for receiving the optical signal therefrom;
- a jet pipe attached to a "U" shaped support connected to the bellows, the jet pipe extending downwardly from the support and moved by expanding gas when the gas is heated in the bellows; and
- a servo-fluid inlet connected to the jet pipe and a first and second servo fluid outlet connected to the jet pipe, the jet pipe directing the fluid from the fluid inlet to the fluid outlets as the jet pipe is moved by the expansion of the gas in the bellows.

* * * * *